United States Patent [19]
Hickam et al.

[11] 3,868,059
[45] Feb. 25, 1975

[54] MAGNETIC BRIDGE-TYPE METER FOR MAGNETICALLY PERMEABLE PARTICULATE MATTER

[75] Inventors: William M. Hickam, Pittsburgh; Robert G. Charles, Allison Park, both of Pa.

[73] Assignee: Westinghouse Electric Corporation, Pittsburgh, Pa.

[22] Filed: Jan. 7, 1974

[21] Appl. No.: 431,587

[52] U.S. Cl. ................. 236/15 E, 324/141, 431/76
[51] Int. Cl. .............................................. F23n 1/02
[58] Field of Search ........ 236/15 E; 431/76; 324/41, 324/45

[56] References Cited
UNITED STATES PATENTS

| | | | |
|---|---|---|---|
| 2,603,964 | 7/1952 | Foley et al. | 236/15 E |
| 2,992,369 | 7/1961 | La Rocca | 324/41 X |
| 3,015,061 | 12/1961 | Boeke | 324/41 X |

*Primary Examiner*—Edward G. Favors
*Attorney, Agent, or Firm*—C. M. Lorin

[57] ABSTRACT

Apparatus for quantitatively analyzing the content of magnetically permeable material in a fluid stream with the use of a magnetic bridge circuit which becomes unbalanced in response to the flow of magnetically permeable particulate material through an air gap in one of the two legs of the bridge. The presence and amount or flow rate of magnetically permeable particles is detected preferably by means of a Hall generator or the like in a common magnetic flux path of the bridge.

8 Claims, 5 Drawing Figures

MAGNETIC BRIDGE-TYPE METER FOR MAGNETICALLY PERMEABLE PARTICULATE MATTER

BACKGROUND OF THE INVENTION

While not limited thereto, the present invention is particularly adapted for use as a fly ash flux meter. As is known, numerous processes result in the emission of particulates into the atmosphere. Increased concern regarding the pollution of the atmosphere has resulted in more stringent Governmental regulations regarding the maximum allowable emission levels for particulates. Among the contributors to particulate pollution, coal-fired power plants represent a major potential source of such pollution and are closely watched by those with the assigned responsibility for enforcing regulations regarding particulate emissions. Futhermore the decrease in availability of high quality coal has forced power plants to burn coal containing increased percentages of ash.

The most frequent method used for measuring the fly ash from a coal-fired furnace is by gas sampling through a filter or aqueous medium. The particulate collected is visually compared to reference standards or treated and weighed gravimetrically. Both techniques have severe disadvantages. The visual comparison method is usually qualitative and at best only semiquantitative. The particle size distribution of fly ash results in differences in gas sorption properties. Therefore, it is difficult to process samples and obtain well-defined gravimetric results. Light scattering techniques have been applied to the measurement of particulates but many difficulties must be resolved before the method can be made quantitative for fly ash.

Futhermore, most of the fly ash measurement methods in use are batch type and require sampling. Batchtype sampling and analysis methods are generally slow and cannot be adapted for use in automatic control. Ideally, a fly ash flux monitor should be capable of providing a continuous signal for use in automatic control and alarm.

SUMMARY OF THE INVENTION

The present invention is based on the magnetic characteristics of certain particulate materials, including fly ash. Fly ash is significantly ferromagnetic, the ferromagnetic fraction being found distributed throughout all fly ash particles as evidenced by their adherence to a permanent magnet. It is believed that the principal ferromagnetic component in fly ash is magnetic iron oxide, $Fe_3O_4$. However, the heat-labile oxide $\gamma$-$Fe_2O_3$ is also present in a smaller amount as a second magnetic component, the two together constituting about 8.7 weight percent of a typical fly ash.

Specifically, the apparatus of the invention for quantitatively analyzing the content of magnetically permeable particulate material in a fluid stream, such as fly ash passing through a flue, includes a magnetic bridge circuit having two magnetic loops each including a common magnetic flux path and leg portions connecting opposite ends of the common path. Air gaps are provided in the respective leg portions; while a conduit conducts a fluid stream having magnetically permeable particulate material entrained therein through one of the air gaps. By providing means in the common path, such as the Hall generator, for sensing unbalance of the bridge circuit in response to the flow of particulate material through the air gap, the output of the Hall generator will be a measure of the amount of particulate material entrained in the fluid stream. If a permanent magnet is utilized to energize the magnetic circuit, magnetically permeable particulate matter such as fly ash, entrained in a fluid stream, will tend to be trapped near the magnet poles. The accumulation of fly ash with time, in this manner, provides a self-integrating action which greatly increases the practical sensitivity of the device. Accumulated fly ash can be removed at the end of convenient periods of time by means of any of a variety of automatically actuated mechanical devices.

If an electromagnet, rather than a permanent magnet, is used to energize the magnetic circuit, accumulated fly ash can be removed from the device by periodically interrupting the electrical current to the magnet coil.

The above and other objects and features of the invention will become apparent from the following detailed description taken in connection with the accompanying drawings which form a part of this specification, and in which.

Figure 1:
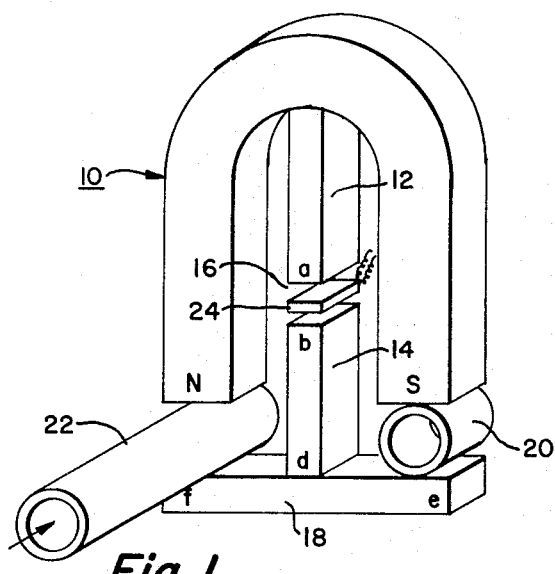
FIG. 1 is an illustration of one embodiment of the invention.

With reference now to the drawings, and particularly to FIG. 1, the apparatus shown includes a permanent magnet 10 forming part of a magnetic bridge circuit having two magnetic loops each including a common magnetic flux path comprised of soft iron bars 12 and 14 separated by an air gap 16. Leg portions interconnect the opposite ends of the common path formed by the bars 12 and 14, the two leg portions being formed by the opposite legs of the permanent magnet 10, a soft iron keeper bar 18 and two air gaps each of which has disposed therein a conduit or pipe of nonmagnetic material 20 or 22. The pipe 20 serves simply as a reference pipe and is empty; whereas the pipe 22 is adapted to convey a fluid stream containing entrained fly ash or other magnetically permeable particulate material.

As can be seen in FIG. 1, the north pole of the permanent magnet 10 induces a north pole at end $b$ of the soft iron bar 14 as a consequence of the magnetic flux across the air gap $Nf$ and along the high permeability flux path $fdb$. However, an equal south pole is also induced at $b$ by means of the flux along the path $Sedb$. In the absence of magnetically permeable material flowing through the pipe 22, the two induced poles at $b$ cancel each other and no net magnetic field is sensed at $b$ by an indium arsenide Hall effect element 24 within the air gap 16 between points $a$ and $b$. If, however, the bridge becomes unbalanced as when ferromagnetic particulate material flows through the pipe 22, the two magnetic poles induced at $b$ will no longer be equal. Under these conditions, the Hall effect element 24 will sense a net magnetic field, the magnitude of which will be a measure of the nature and amount of magnetic material introduced into the air gap. The Hall generator 24, well known in the art, comprises a wafer of semiconductive material such as indium arsenide having a source of direct current potential connected to two of its edges and output terminals connected to its other two edges. The application of a magnetic flux field in a transverse direction across the wafer, as when the bridge of FIG. 1 is unbalanced, produces a deflection of a control current through the wafer which is normal to the applied field. This deflection of current from the direct current source creates a difference in potential or Hall voltage which appears across the opposite edges of the wafer and which is proportional to the product of the current and magnetic flux. Changes in the magnetic flux field due to the presence of magnetically permeable material in the pipe 22 will, therefore, be reflected in the voltage output of the Hall generator.

Figure 2:
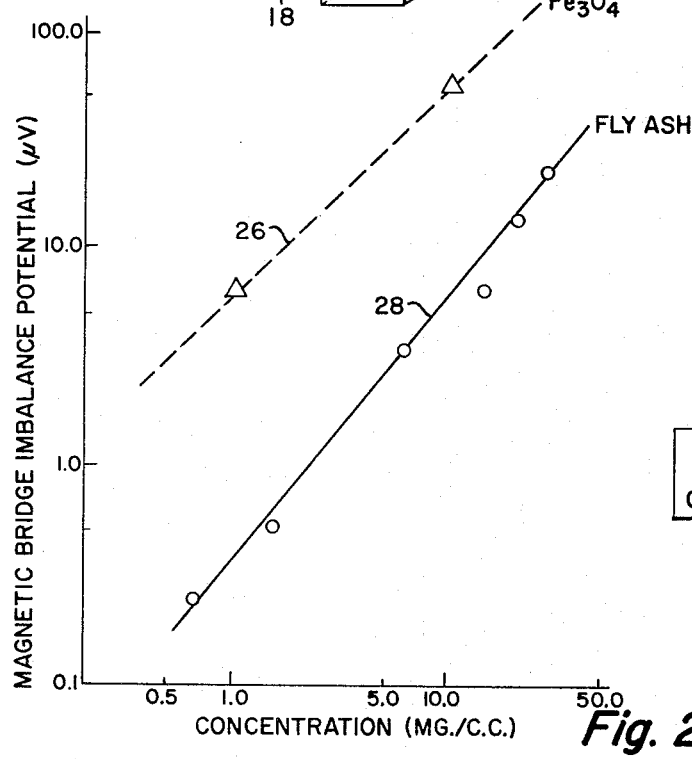
FIG. 2 is a plot of concentration of particulate material (fly ash) versus magnetic bridge imbalance potential.

As was mentioned above, typical samples of fly ash contain about 8.7 percent by weight of $Fe_3O_4$ and $\gamma$-$Fe_2O_3$. These, of course, are magnetically permeable and will unbalance the bridge if caused to flow through the pipe 22. This is illustrated in FIG. 2 wherein the curve 26 is a plot of concentration in milligrams per cubic centimeter of pure $Fe_3O_4$ versus the microvolt output of the Hall generator 24. Curve 28 is a similar plot for the case where fly ash passes through the conduit 22. It can be seen that as the concentration of fly ash increases so also does the output of the Hall voltage generator. Furthermore, this increase is linear, or nearly linear.

As discussed above, the use of a permanent magnet in the device of FIG. 1 results in the accumulation of magnetic particulate matter in the gap between the north magnetic pole and the bar 18. While this results in increased sensitivity for the device, since integration of the Hall element electrical output can be carried out over as long a period as desired, it does require that some mechanical means be employed for periodically removing the particulate accumulation. This problem is circumvented in the embodiment of the invention shown in FIG. 2. Here the horseshoe-shaped magnet of FIG. 1 is replaced by a soft iron piece of the same shape which becomes an electromagnet when current is supplied to the concentric wire coil 34. So long as electrical current is supplied by pulse source 32, the device functions in much the same manner as that shown in FIG. 1. However, by periodically interrupting the current any accumulation of magnetic particulate matter is automatically swept away from the device by the force of incoming fluid in conduit 22.

Figure 3:
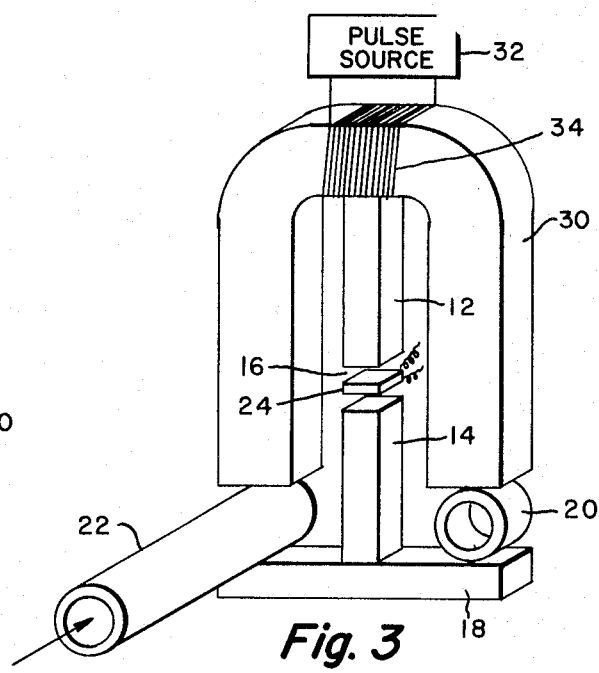
FIG. 3 is an illustration of another embodiment of the invention employing an electromagnet.
Figure 4:
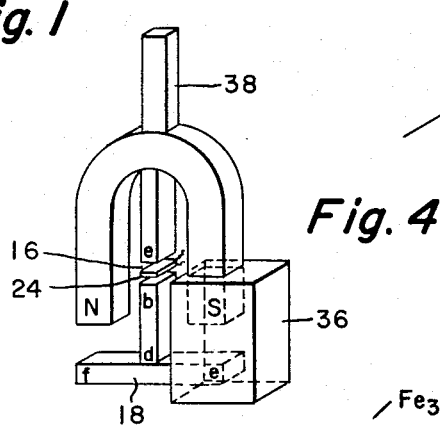
FIG. 4 is an illustration of a third embodiment of the invention.

The devices shown in FIGS. 1 and 2 are designed to accept fluid containing entrained magnetic particulate matter through conduits 22. Conduits 20 must be maintained free of entrained magnetic permeable particles in order to function as reference gaps. For use in monitoring the fly ash content of the flue gases, for example, it would be necessary therefore to divert a portion of the gases through the relatively small diameter conduits 22. For some applications it would be desirable to employ our device in an alternate probe configuration which could be inserted directly through the wall of a much larger conduit or flue. Such a probe configuration is shown in FIG. 4. The device of FIG. 4 differs from that shown in FIG. 1 in that the gap between the south magnet pole and bar 18, of FIG. 1, as well as the volume immediately adjacent to this gap, is completely and permanently filled by a nonmagnetic encapsulant material 36. The presence of encapsulant 36 assures that no magnetic material can approach the reference gap when the entire device is exposed to fluid containing entrained magnetic particulate matter. In use, the device of FIG. 4 would be inserted through the wall of a flue and held in place by the support rod 38. it will be apparent to anyone skilled in the art that the device shown in FIG. 3 could also be modified by the use of encapsulant material to form a similar probe type sensor.

Figure 5:
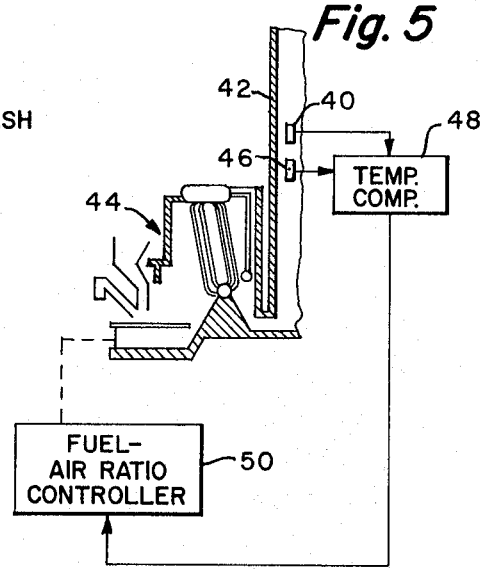
FIG. 5 is a schematic circuit diagram illustrating the manner in which the flux meter of the invention can be used to automatically control the fuel-air ratio of a furnace.

One practical application for the meter of the invention is shown in FIG. 5. A meter, of the type shown in FIG. 4 and indentified by the reference numeral 40, is positioned within the flue 42 of a boiler installation 44. Since the magnetic characteristics of $Fe_3O_4$ are temperature dependent, since the Hall element output is somewhat affected by temperature, and since the iron content of coal will vary, information regarding these parameters is required in making an accurate quantitative measurement. Accordingly, temperature sensing means 46 is positioned within the flue 42 adjacent the flux meter 40, the output of the temperature sensing 46 being applied to a temperture compensating circuit 48 which corrects the output of the meter for changes in temperature. The output of circuit 48 is then applied to a fuel air ratio controller 50 which controls the fuel feed rate and/or air fed into the boiler installation 44. The controller 50 can include adjustable means for compensating for the amount of iron in the coal being burned as determined by previous analysis.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. Apparatus for quantitatively analyzing the content of magnetically permeable particulate material in a fluid stream, comprising a magnetic bridge circuit having two magnetic loops each including a common magnetic flux path and leg portions connecting opposite ends of the commmon path, air gaps in the respective leg portions, means for conducting a fluid stream having said particulate material entrained therein through one of said air gaps, and means in said common path for sensing unbalance of the bridge circuit and for producing an electrical signal which varies as a function of the degree of unbalance, the arrangement being such that as the particulate material passes through the air gap, the bridge will become unbalanced and said electrical signal will be a measure of the amount of magnetically permeable material passing through the air gap.

2. The apparatus of claim 1 wherein said means for conducting a fluid stream through one of said air gaps comprises a conduit form of nonmagnetic material.

3. The apparatus of claim 1 wherein said means for conducting a fluid stream through one of said air gaps consists of the wall of a flue and with said apparatus including means for protecting the second air gap said last named means consisting of nonmagnetic encapsulating material.

4. The apparatus of claim 1 wherein said means in the common path for sensing unbalance of the bridge circuit comprises a Hall generator.

5. The apparatus of claim 1 wherein said magnetic bridge circuit includes an electromagnet, and means for peridically energizing said elelctromagnet whereby the flux across said air gap will be intermittent.

6. The appartus of claim 1 wherein said magnetically permeable particulate material comprises an oxide of iron in fly ash.

7. The apparatus of claim 6 including means for causing fly ash from a furnace installation to flow through said one air gap, and including means for varying the fuelair ratio of said furnace installation as a function of the magnitude of said electrical signal.

8. The apparatus of claim 7 including means for measuring the temperature of the fly ash passing through said one air gap, and means for modifying said electrical signal which controls the fuel-air ratio as a function of variations in temperature.

* * * * *